UNITED STATES PATENT OFFICE 2,053,822

ALKYLATED IMIDAZOLES OF HIGH MOLECULAR WEIGHT AND PROCESS OF MAKING SAME

Charles Graenacher, Basel, and Franz Ackermann, Binningen, near Basel, Switzerland, assignors to the firm of Society of Chemical Industry in Basle, Basel, Switzerland No Drawing. Application December 13, 1934, Serial No. 757,374. In Switzerland December 15, 1933

16 Claims. (Cl. 260—44)

The invention relates to the manufacture of alkylated imidazoles of high molecular weight and the derivatives thereof, by treating with an alkylating agent containing at least 7 carbon atoms and whose chain may be interrupted by an organogenic element (cf. Lehrbuch der Organischen Chemie by Paul Karrer, Leipzig (1928), page 4: "Zusammensetzung und Analyse organischer Verbindungen", particularly line 4) which, in respect of hydrogen, is not higher than trivalent that is to say oxygen, sulfur and nitrogen, an imidazole characterized by the atom grouping

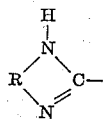

in which R is an aromatic nucleus. The organogenic elements which, in respect of hydrogen, are not higher than trivalent are oxygen, sulfur or nitrogen. As alkylating agents there may be named, for example, chloracetic-amyl ester, $\beta$-chloro-lactic-butyl ester, chloracetic-dodecyl ester, dodecyl-$\beta$-ethyl-chloride-ether, octadecyl-methyl-chloride-ether, chloro-$\beta$-hydroxy-N-propyl-dodecylthio-ether (from dodecyl-mercaptan and epichlorhydrine), cetyl-$\beta$-ethylchloride-thioether, chloracetyl-decylamide, further alkylating agents without a bridge, such as heptyl-chloride, octyl-bromide, dodecyl-iodide, octadecenyl-chloride and the like. There come also into consideration sulfuric acid esters of higher alcohols and the like.

The products thus obtained have capillary activity, which renders them suitable for use as auxiliary agents in all industries in which agents for emulsifying, dispersing, softening, washing or wetting are used.

The capillary activity of the new products may be enhanced in many cases by further treating the product with agents having a sulfonating action or also by subjecting the product to both a sulfonation and an alkylation in any desired sequence, whereby ammonium compounds are produced.

Products of like properties may also be obtained by treating with the alkylating agent containing at least 7 carbon atoms those imidazoles which contain at the nitrogen atom an alkyl radical consisting of at most 6 carbon atoms, and sulfonating the products thus obtained.

In the foregoing general formula R may be an aromatic nucleus, for example a nucleus of the benzene, naphthalene, anthracene, phenanthrene or diphenyl series or of any other series. It may comprise substituents, for example alkyl-, hydroxyl-, oxalkyl-, carboxyl-, sulfo-, or like groups. The substituents may also be of cyclic form, as is the case with tetrahydronaphthalene. As imidazoles which come into consideration here as parent materials there may be named both imidazoles themselves, such as benzimidazole, as well as their $\mu$-substitution products. As such products there may be named the $\mu$-alkylated benzimidazoles, such as $\mu$-methyl-, $\mu$-hydroxymethyl-, $\mu$-ethyl-, $\mu$-propyl-, $\mu$-$\gamma$-hydroxypropyl-, $\mu$-butyl-, $\mu$-$\delta$-hydroxybutyl-, $\mu$-cyclohexyl-, $\mu$-vinyl-, $\mu$-phenyl-, $\mu$-benzyl-, $\mu$-undecyl-, $\mu$-pentadecyl-, $\mu$-heptadecenyl-, benzimidazoles or naphthimidazoles. Finally the $\mu$-substituent may be of a wholly different character, such as in the case of the methoxy- or $\mu$-ethoxybenzimidazole, or in the case of the $\mu$-mercapto- or $\mu$-thioalkylbenzimidazole or naphthimidazole.

Among these products those are inter alia valuable in which the $\mu$-substituent contains at the most 3 carbon atoms as is the case for example with the $\mu$-methylbenzimidazoles, the $\mu$-ethylbenzimidazoles, the $\mu$-aminobenzimidazoles and the benzimidazole itself.

Also those imidazoles demand a special interest whose $\mu$-substituent consists of a long aliphatic chain, such as, for example, the pentadecyl- or heptadecenyl radical. These products then lead to new imidazole derivatives which are characterized by the fact that they have twice a characteristic lyophobe grouping.

Thus the new imidazoles are characterized by the atom grouping

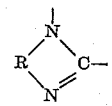

wherein the radical R represents a sulfonated aromatic radical, wherein further the nature of the $\mu$-substituent follows from the above enumerations, and wherein at least one of the two nitrogen atoms is linked with a radical $R_1$. If the products contain only a radical $R_1$ the latter stands for an alkyl group containing at least 7 carbon atoms. These products, in the form of their salts, correspond to the general formula

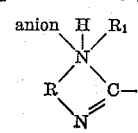

in which R is a sulfonated aromatic radical and R₁ an alkyl group containing at least 7 carbon atoms, and wherein these carbon atoms may be present in the form of an uninterrupted chain or also in the form of a chain interrupted by an organogenic element which in respect of hydrogen is not higher than trivalent. Besides the nature of these alkyl radicals follows from the alkylating agents cited above as examples. If the two nitrogen atoms are substituted by the radical R₁ these products form with acids imidazolium compounds which are characterized by the atom grouping

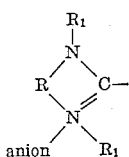

in which one R₁ has the meaning already indicated above, and the other R₁ stands for an alkyl group containing less than 7 carbon atoms. Not only the products wherein only one nitrogen atom is substituted by a radical R₁, but also the products wherein both nitrogen atoms are linked with a radical R₁ form with bases salts which represent solid fat-like masses, and which dissolve in water with formation of highly capillary active solutions.

The new sulfonated products are also imidazole derivatives having the atom grouping

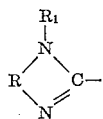

wherein R represents a sulfonated aromatic radical and R₁ an alkyl radical containing at least 7 carbon atoms, which products form with alkalies alkali salts which are in a dry state colorless to weakly colored powders and dissolve in water with formation of foaming solutions which possess excellent wetting, washing, levelling and dispersing properties.

The following examples whose number may be increased ad libitum illustrate first the manufacture of the compounds which are converted into sulfonic acids:—

*Example 1*

52 parts of μ-methylbenzimidazole are stirred with 80 parts of lauryl-chloride for about 8 hours at 160° C. As soon as a sample of the mass dissolves clearly in acidified water, the heating is interrupted and the reaction product allowed to cool; it is then a tallowy mass which can be dissolved in alcohol, if necessary, and decolorized completely by means of animal charcoal. The N-lauryl-μ-methylbenzimidazole hydrochloride forms in water strongly foaming solutions and is, for example, a pronounced softening agent for viscose artificial silk. Similar products are obtained when cetyl-, stearyl- or oleyl-chloride is used instead of lauryl-chloride.

*Example 2*

183 parts of benzimidazole are stirred with 260 parts of cetyl chloride at 160° C. until a sample of the mass dissolves clearly in water containing formic acid. After cooling, the product is a bright colored semi-solid mass which has properties similar to those of the product described in Example 1.

*Example 3*

50 parts of N-cetyl-μ-methylbenzimidazole-hydrochloride, obtainable as described in Example 1, are dissolved in hot water with addition of a small proportion of formic acid, whereupon the addition of caustic soda solution precipitates the free base in the form of an oil which solidifies when cooled. This oil is separated from the aqueous layer, washed and dried.

40 parts of this base are heated with 15 parts of ethyl-chloride for 12 hours in a pressure vessel to 150–155° C. After distilling the excess of ethyl-chloride there is left a semi-solid mass easily soluble in water and of pronounced dispersing action; this compound also has the property of enhancing essentially the fastness to water of dyeings obtained with direct dyestuffs.

*Example 4*

132 parts of μ-methylbenzimidazole are heated with 270 parts of chloracetic dodecyl ester for about 6 hours to 170–175° C. After cooling there is obtained a soft fatty mass of μ-methyl-N-acetic dodecyl ester-imidazole hydrochloride. The latter is soluble in acidified water to a foaming solution and may be used inter alia for making dyed fabrics fast to water and as softening agent.

*Example 5*

14,8 parts of μ-hydroxymethylbenzimidazole and 20 parts of dodecylchloride are stirred at 170–180° C. until a sample of the mass dissolves clearly in acidified water. As soon as this is the case the reaction product is allowed to cool. The μ-hydroxymethyl-N-laurylbenzimidazole-hydrochloride thus obtained forms a semi-solid mass which is soluble in water to a forming solution and which may find application for example as acid levelling agent in dyeing.

A similar product is obtained when using equimolecular quantities of μ-methoxymethylbenzimidazole instead of the μ-hydroxymethylbenzimidazole.

*Example 6*

21,2 parts of μ-methyl-N-hydroxyethyl-benzimidazole hydrochloride and 28 parts of stearic acid chloride are heated for 4 hours to 105–110° C., while stirring. After cooling there is obtained a colorless powder of μ-methyl-N-stearylhydroxyethylimidazole hydrochloride which may be used for example as levelling agent in dyeing or as softening agent.

*Example 7*

7,3 parts of μ-ethylbenzimidazole and 9,4 parts of octylbromide are heated for about 18 hours to 150–155° C. After cooling the μ-ethyl-N-octylbenzimidazole-hydrobromide is obtained as a solid mass which is soluble in acidified water and possesses excellent levelling properties.

The above examples illustrate how the new products are obtained which, according to the present invention, are converted into sulfonic acids. The conversion into sulfonic acids may be carried out according to the following examples:—

*Example 8*

12 parts of the N-cetyl-μ-methylbenzimidazole-hydrochloride, made as described in Example 1, are dissolved at 15–20° C. in 25 parts of sulfuric acid monohydrate. There are then allowed to run gradually into the solution 12 parts of fuming sulfuric acid of 24 per cent. strength and the mixture is stirred at the aforesaid temperature until a sample dissolves clearly in aqueous alkali. When this is the case the mass is poured into icewater, the sulfonic acid thus precipitated is filtered and washed with water until neutral; if desired it may be converted into its alkali salt.

The sodium salt of N-cetyl-μ-methyl-benzimidazole sulfonic acid thus obtained is a colorless powder, soluble in water to a strongly foaming solution; it is a pronounced washing and levelling agent.

Example 9

33,6 parts of μ-heptadecyl-benzimidazole and 21 parts of dodecyl chloride are stirred for 16 hours at 170° C. When cold the mass is treated with benzine in order to remove any dodecyl chloride still present, the N-dodecyl-μ-heptadecyl-benzimidazole hydrochloride being precipitated as an insoluble residue.

20 parts of the mass thus obtained are dissolved in 50 parts of sulfuric acid monohydrate at 0 to +5° C., evolution of hydrochloric acid taking place. 40 parts of fuming sulfuric acid of 24 per cent. strength are then allowed to flow slowly into this mixture, whereupon stirring is continued at 0 to +5° C. until a sample of the reaction mass dissolves completely in dilute alkali. The sulfonation mixture is thereupon poured into ice water, the separated sulfonic acid filtered off, washed and converted into its alkali salt as usual.

The sodium salt of the N-dodecyl-μ-heptadecyl-benzimidazole-sulfonic acid thus obtained dissolves in water with formation of strongly foaming solutions, and possesses good washing and dispersing properties.

Example 10

33,6 parts of μ-heptadecyl-benzimidazole and 26,3 parts of 2-chloracetic dodecyl ester are stirred for 16 hours at 170° C. When cold the mass is treated with benzine in order to remove any 2-chloracetic dodecyl ester still present, the N-acetic-dodecyl-ester-μ-heptadecylbenzimidazole hydrochloride being precipitated as an insoluble residue.

20 parts of the mass thus obtained are dissolved in 50 parts of sulfuric acid monohydrate at 0 to +5° C., slight evolution of hydrogen chloride gas taking place. 40 parts of fuming sulfuric acid of 24 per cent. strength are then allowed to flow slowly into this mixture, whereupon stirring is continued at 0 to +5° C. until a sample of the reaction mass dissolves completely in dilute alkali. The sulfonation mixture is thereupon poured into ice water, the separated sulfonic acid filtered off, washed and converted into its alkali salt as usual.

The sodium salt of the N-acetic dodecyl ester-μ-heptadecylbenzimidazole sulfonic acid thus obtained dissolves in water with formation of strongly foaming solutions, and possesses good washing and dispersing properties.

Products having similar properties are also obtained when sulfonating the other imidazolium derivatives described in the other examples or which follow from the data in the preamble of this specification. The sulfonation may be carried out with chlorosulfonic acid or also with sulfuric acid monohydrate.

Products having similar properties are finally obtained by treating a sulfonic acid of an imidazole of the general formula

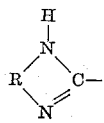

in which R represents one of the aromatic radicals cited in the preamble, with such alkylating agents which contain more than 7 carbon atoms.

What we claim is:—

1. Process for the manufacture of sulfonic acids, consisting in treating with sulfonating agents imidazole derivatives having the atom grouping

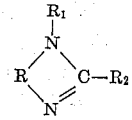

in which R represents a carbocyclic aromatic radical containing at the most 10 carbon atoms, $R_1$ represents an alkyl radical containing at least 7 carbon atoms and $R_2$ is a member selected from the group consisting of hydrogen and alkyl.

2. Process for the manufacture of sulfonic acids, consisting in treating with sulfonating agents imidazole derivatives having the atom grouping

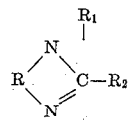

in which R represents an aromatic radical of the benzene series, $R_1$ represents an alkyl radical containing at least 7 carbon atoms and $R_2$ is a member selected from the group consisting of hydrogen and alkyl.

3. Process for the manufacture of sulfonic acids, consisting in treating with sulfonating agents imidazole derivatives having the atom grouping

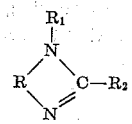

in which R represents an aromatic radical of the benzene series, $R_1$ represents an alkyl radical consisting of an uninterrupted chain of at least 12 carbon atoms and $R_2$ is a member selected from the group consisting of hydrogen and alkyl.

4. Process for the manufacture of sulfonic acids, consisting in treating with sulfonating agents imidazole derivatives having the atom grouping

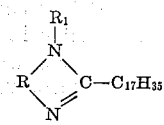

in which R represents an aromatic radical of the benzene series and $R_1$ an alkyl radical consisting of an uninterrupted chain of at least 12 carbon atoms.

5. Process for the manufacture of sulfonic acids, consisting in treating with sulfonating agents imidazole derivatives having the atom grouping

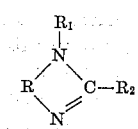

in which R represents an aromatic radical of the benzene series, $R_1$ represents an alkyl radical whose chain consists of at least 7 carbon atoms and is interrupted by an organogenic element which in respect of hydrogen is not higher than trivalent and R₂ is a member selected from the group consisting of hydrogen and alkyl.

6. The imidazole derivatives of the general formula

in which R represents a sulfonated carbocyclic aromatic radical containing at the most 10 carbon atoms, R₁ represents an alkyl radical containing at least 7 carbon atoms and R₂ is a member of the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

7. The imidazole derivatives of the general formula

in which R represents a sulfonated aromatic radical of the benzene series, R₁ represents an alkyl radical containing at least 7 carbon atoms and R₂ is a member selected from the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

8. The imidazole derivatives of the general formula

in which R represents a sulfonated aromatic radical of the benzene series, R₁ represents an alkyl radical consisting of an uninterrupted chain of at least 7 carbon atoms and R₂ is a member selected from the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

9. The imidazole derivatives of the general formula

in which R represents a sulfonated aromatic radical of the benzene series, R₁ represents an alkyl radical consisting of an uninterrupted chain of 12 carbon atoms and R₂ is a member selected from the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

10. The imidazole derivatives of the general formula

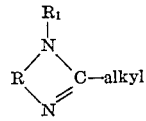

in which R represents a sulfonated aromatic radical of the benzene series and R₁ an alkyl radical consisting of an uninterrupted chain of 12 carbon atoms, which products form with alkalies alkali salts which are in a dry state colorless to weakly colored powders and dissolve in water with formation of foaming solutions which possess excellent wetting, washing, levelling and dispersing properties.

11. The imidazole derivatives of the general formula

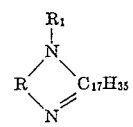

in which R represents a sulfonated aromatic radical of the benzene series and R₁ an alkyl radical consisting of an uninterrupted chain of 12 carbon atoms, which products form with alkalies alkali salts which are in a dry state colorless to weakly colored powders and dissolve in water with formation of foaming solutions which possess excellent wetting, washing, levelling and dispersing properties.

12. The imidazole derivatives of the general formula

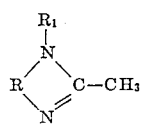

in which R represents a sulfonated aromatic radical of the benzene series and R₁ an alkyl radical consisting of an uninterrupted chain of 12 carbon atoms, which products form with alkalies alkali salts which are in a dry state colorless to weakly colored powders and dissolve in water with formation of foaming solutions which possess excellent wetting, washing, levelling and dispersing properties.

13. The imidazole derivatives of the general formula

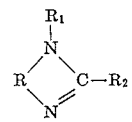

in which R represents a sulfonated aromatic radical of the benzene series, R₁ represents an alkyl radical whose chain consists of at least 7 carbon atoms and is interrupted by an organogenic element which in respect of hydrogen is not higher than trivalent and R₂ is a member selected from the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

14. The imidazole derivatives of the general formula

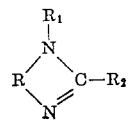

in which R represents a sulfonated aromatic radical of the benzene series, R1 represents an alkyl radical whose chain consists of at least 14 carbon atoms and is interrupted by an organogenic element which in respect of hydrogen is not higher than trivalent and R2 is a member selected from the group consisting of hydrogen and alkyl, which products form with alkalies alkali salts which are in a dry state colorless to weakly colored powders and dissolve in water with formation of foaming solutions which possess excellent wetting, washing, levelling and dispersing properties.

15. The imidazole derivatives of the general formula

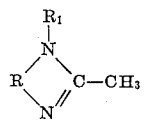

in which R represents a sulfonated aromatic radical of the benzene series and R1 an alkyl radical whose chain consists of at least 14 carbon atoms and is interrupted by an organogenic element which in respect of hydrogen is not higher than trivalent, which products form with alkalies alkali salts which are in a dry state colorless to weakly colored powders and dissolve in water with formation of foaming solutions which possess excellent wetting, washing, levelling and dispersing properties.

16. The imidazole derivatives of the general formula

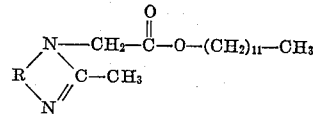

in which R represents a sulfonated aromatic radical of the benzene series, which products form with alkalies alkali salts which are in a dry state colorless to weakly colored powders and dissolve in water with formation of foaming solutions which possess excellent wetting, washing, levelling and dispersing properties.

CHARLES GRAENACHER.
FRANZ ACKERMANN.